United States Patent [19]
Tidwell

[11] Patent Number: 5,325,390
[45] Date of Patent: Jun. 28, 1994

[54] CORRECTION OF THERMALLY-INDUCED ABERRATION IN END-PUMPED SOLID-STATE LASERS

[75] Inventor: Steve C. Tidwell, Woodinville, Wash.

[73] Assignee: Amoco Corporation, Naperville, Ill.

[21] Appl. No.: 880,495

[22] Filed: May 8, 1992

[51] Int. Cl.$^5$ .............................................. H01S 3/091
[52] U.S. Cl. ....................... 372/71; 372/99; 372/29; 372/34; 372/108; 372/92
[58] Field of Search .................... 372/98, 88, 101, 99, 372/107, 108, 71, 29, 34

[56] References Cited
U.S. PATENT DOCUMENTS

| | | | |
|---|---|---|---|
| 4,408,334 | 10/1983 | Lundstrom | 372/98 |
| 4,803,694 | 2/1989 | Lee et al. | 372/98 |
| 4,848,881 | 7/1989 | Kahan et al. | 372/105 |

Primary Examiner—Léon Scott, Jr.
Attorney, Agent, or Firm—Stephen G. Mican

[57] ABSTRACT

Methods and apparatus for providing substantially complete correction of thermally-induced aberrations of the gain medium in an end-pumped laser system with at least one aspheric surface that is positioned within the optical cavity of the laser system. The at least one aspheric surface is shaped to substantially cancel all of the thermally-induced aberration of the gain medium at the normal power level of the laser system.

12 Claims, 4 Drawing Sheets

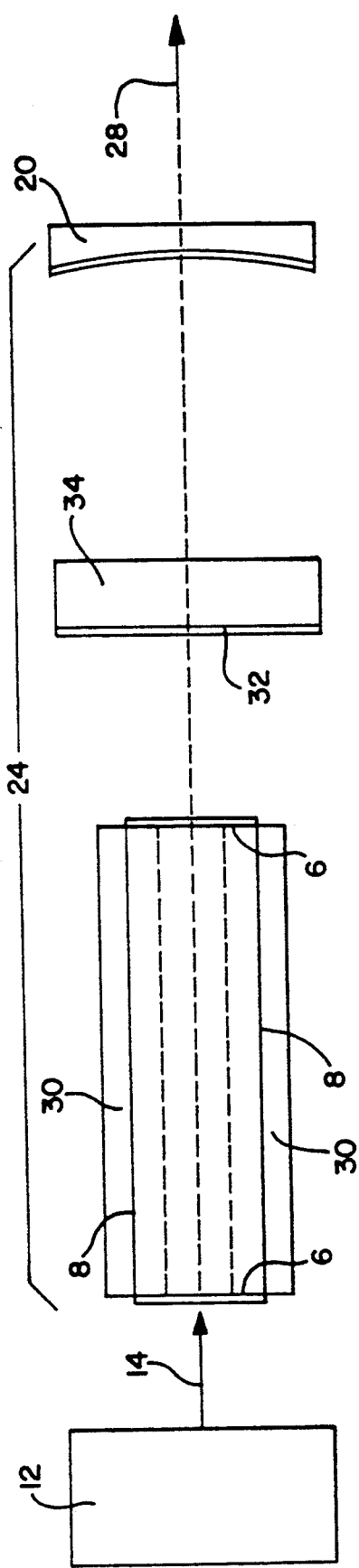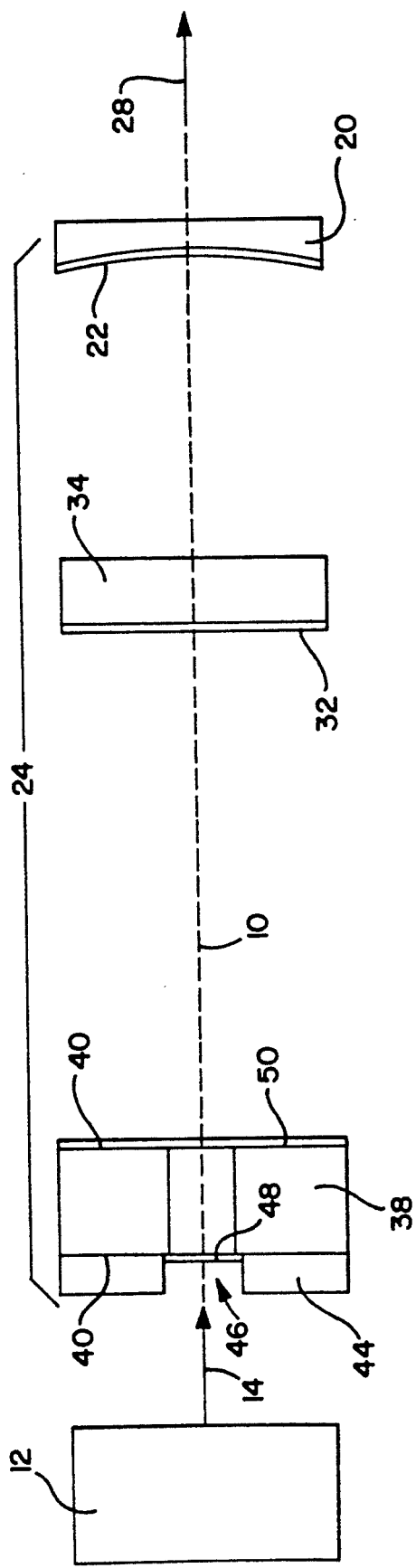

CORRECTION OF THERMALLY-INDUCED ABERRATION IN END-PUMPED SOLID-STATE LASERS

FIELD OF THE INVENTION

The present invention is directed to high-power, high efficiency end-pumped solid-state lasers, and more specifically to methods and apparatus for correction of thermally-induced aberrations in such lasers to achieve high efficiency and beam quality.

BACKGROUND OF THE INVENTION

Fundamental inefficiencies in the lasing process of any laser system result in some fraction of the pump power being left behind as waste heat in the lasing medium. This heat causes a change in the index of refraction and thermal expansion of the lasing medium. The wavefront of the extraction beam is distorted if it is passed through a lasing medium with non-uniform temperature distribution. The specific parameters of the pump, extraction, cooling and gain medium geometry determine the nature of such wavefront distortion.

Thermally-induced distortion generated in side-pumped lasers can be substantially eliminated with simple focus correction. However, the non-uniform heat distribution in end-pumped lasers is inherently non-uniform, so that the correction of thermally-induced distortion is more complex than simple focus correction. In this case, the distortion may be represented by a combination of focus and higher-order spherical aberrations.

An optical wavefront that is a surface of revolution can be defined as the sum of its oscillating sphere plus higher order terms by means of the following relationship, taking the z-axis as the axis of revolution, $$z = \frac{c s^2}{1 + (1 - c^2 s^2)^{\frac{1}{2}}} + B_1 s^4 + B_2 s^6 + B_3 s^8 + \cdots$$

where $c = 1/\text{radius of curvature}$ and $s = x^2 + y^2$. Also, $B_1$ $B_2$ and $B_3$ are the aspheric deformation constants. The $B_i$ constants represent the higher-order spherical aberrations while the first term in this wavefront expansion relationship represents the focus. In a conventional resonator, that is, one with a combination of spherical and flat surfaces, only the first term in the wavefront distortion expansion can be corrected.

The spherical aberrations reduce the output beam quality as well as the laser efficiency. Laser efficiency is reduced because the distortion diffracts power out of the fundamental mode volume of the laser cavity, thereby causing significant round-trip losses. The degree to which the efficiency is reduced depends on the gain, as well as the magnitude and distribution of the aberration. In low gain continuous-wave (CW) lasers, the aberrations can dominate laser performance above output powers of a few Watts.

Correction of thermally-induced aberration has not been a problem with most laser systems, whether side-pumped or end-pumped. As indicated above, for uniformly pumped side-pumped lasers, any thermally-induced distortion is easily suppressed with simple focus correction. End-pumped laser systems have been limited in power by the difficulty of transfer of significant pump energy to the small mode volume within the gain medium, so that the generation of heat within the gain medium has not been sufficient to cause significant thermally-induced aberration.

Recent advances in the art have permitted increased pump power transfer in end-pumped systems to levels that generate enough heat in the gain medium to cause significant thermally-induced aberration. As indicated above, this distortion is difficult to correct, since it includes higher-order spherical aberrations. Simple focus adjustment cannot adequately suppress this distortion. The only known attempt at correcting this type of distortion in end-pumped laser systems involves shaping steeply curved spherical surfaces on each end of an end-pumped laser rod in the laser system optical cavity.

One end surface is made concave and the other convex to provide a degree of under-corrected third-order spherical aberration that largely cancels the thermally-induced aberration. This method of correction is simple, in that only spherical surfaces are necessary, and efficient, in that no additional elements are required. However, this method has several disadvantages. One disadvantage is that the steeply-curved spherical surfaces that are required for the rod ends cause additional loss in the optical cavity since the Fresnel reflections cannot be efficiently coupled back into the laser mode region of the rod.

Another reason is that the under-corrected third-order spherical aberration only approximates the thermally-induced aberration, so that correction is only partial at best. Another reason is that the short radii of the spherical surfaces are difficult to fabricate. Still another reason is that the curved rod surfaces affect the distribution of pump energy. A further reason is that it is more difficult to apply coatings to steeply curved surfaces and the performance of such coatings is degraded.

SUMMARY OF THE INVENTION

The invention provides substantially complete correction of thermally-induced aberrations of the gain medium in an end-pumped laser system with at least one aspheric surface that is positioned within the optical cavity of the laser system. The at least one aspheric surface is shaped to substantially cancel all of the thermally-induced aberration of the gain medium at the normal power level of the laser system.

In the preferred embodiment, the invention comprises a method for reducing thermally-induced aberrations in the wavefront of substantially coherent radiation produced by a gain medium in an end-pumped laser system, comprising the steps of: interacting said wavefront with a substantially spherical surface placed along an optical path of said radiation to reduce at least partially lower-order aberration of said wavefront along said optical path; and interacting said wavefront with a substantially aspheric surface placed along said optical path to reduce higher-order aberrations in said at least partially spherical propagation of said wavefront.

In the preferred embodiment, the invention comprises apparatus for reducing thermally-induced aberrations in the wavefront of substantially coherent radiation produced by a gain medium in an end-pumped laser system, comprising: means for interacting said wavefront with a substantially spherical surface placed along an optical path of said radiation to reduce at least partially lower-order aberration of said wavefront along said optical path; and means for interacting said wavefront with a substantially aspheric surface placed along said optical path to reduce higher-order aberrations in said at least partially spherical propagation of said wavefront.

DESCRIPTION OF THE DRAWINGS

FIG. 1 is a schematic diagram of a first embodiment of the invention.

FIG. 2 is a schematic diagram of a second embodiment of the invention.

DESCRIPTION OF THE INVENTION

Figure 3:
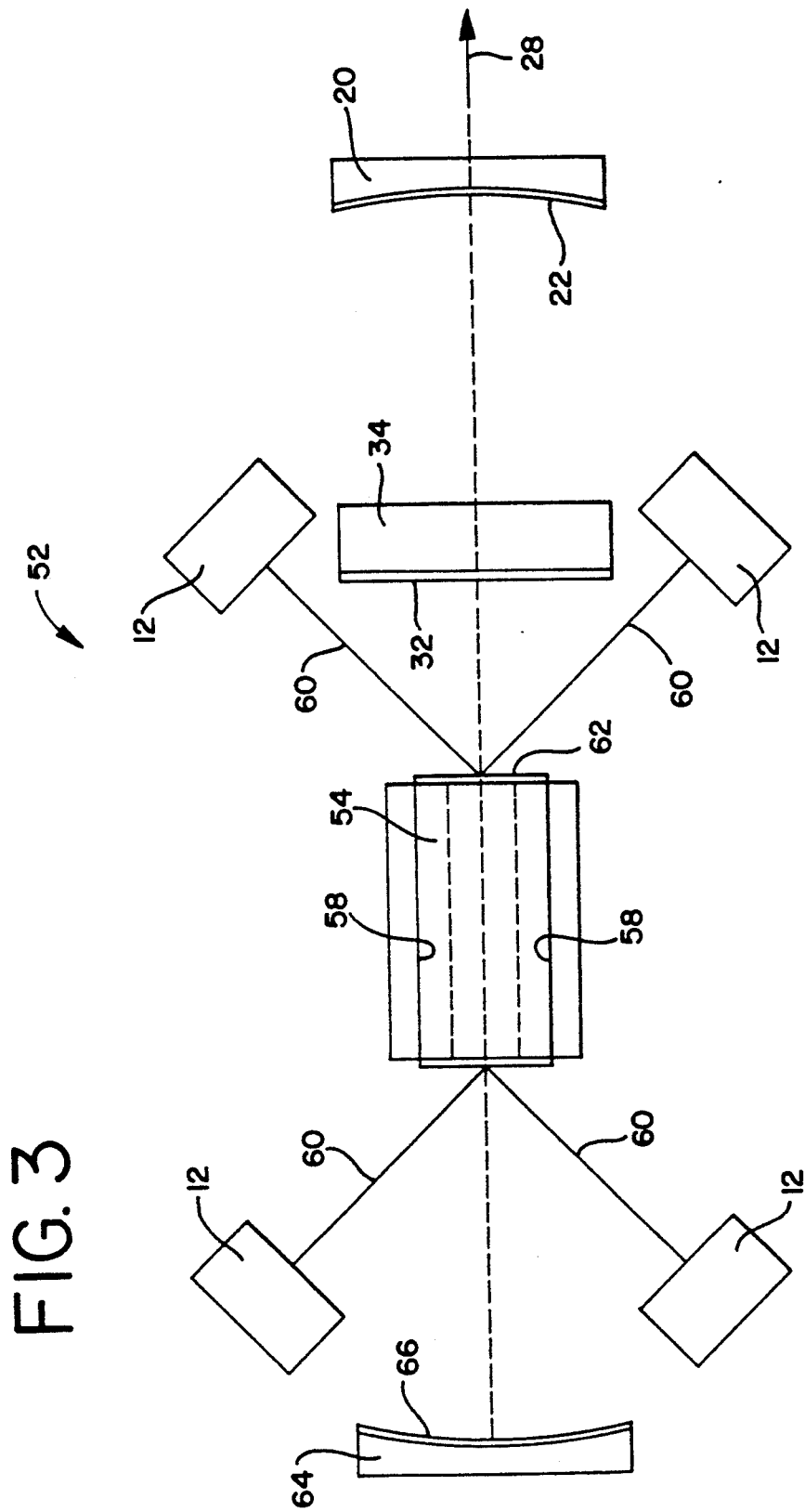
FIG. 3 is a schematic diagram of a third embodiment of the invention.

Referring to the drawings, wherein reference characters designate like or corresponding parts throughout the views, FIG. 1 is a schematic diagram of a typical end-pumped laser system 2 according to the invention that incorporates a first embodiment of the invention. The laser 2 comprises a lasing medium 4 with generally opposed end surfaces 6 and a generally circumferential side surface 8. The end surfaces 6 are substantially centered along an optical path 10. The optical path 10 is represented in dashed line.

At least one means for transmitting pump radiation, typically at least one source of pump radiation 12, transmits pump energy toward at least one of the end surfaces 6 of the lasing medium 4. In FIG. 1, a single source of pump radiation 12, typically a diode-pumped Nd:YLF or Nd:YAG laser source, is shown. At least a portion 14 of the pump radiation from the source of pump radiation 12 propagated into the lasing medium 4 through at least one of the end surfaces 6 along the optical path 10.

The laser system 2 is represented as a laser source in FIG. 1, wherein one of the end surfaces 6 proximate the means for transmitting pumping radiation 10 preferably has a dichroic optical coating 16 applied to it that is relatively transparent to the wavelength of the pump energy and relatively reflective to the at least one wavelength of fluorescence. The other one of the end surfaces 6 preferably has an optical coating 18 applied to it that is relatively transparent to the at least one wavelength of fluorescence. The laser system 2 also has an output coupler 20 along the optical path 10 proximate the one of the end surfaces 6 with the optical coating 8. The output coupler 20 typically comprises a mirror that has a reflective coating 22 on one of its surfaces that is at least partially transparent to the at least one wavelength of fluorescence.

An optical cavity 24 is thus formed between the dichroic optical coating 16 on one of the end surfaces 6 and the reflective coating 22 on one of the surfaces of the output coupler 20. The spacing between the dichroic optical coating 16 and the reflective coating 22 may be adjusted to resonate radiation that propagates within the optical cavity 24 for at least one wavelength of fluorescence of the lasing medium 4.

Of course, the laser system 2 may alternatively comprise a laser amplifier, wherein the optical cavity 24 is not needed, the input radiation is coupled to the laser system via an input wavelength division multiplexer (WDM) and the amplified output radiation is extracted with an output WDM, as well known in the art.

The optical cavity 24 permits a gain region 26 of the lasing medium 4 to absorb pump energy and to recirculate the at least one wavelength of fluorescence to stimulate emission from the lasant material 4 to the extent that a laser beam 28 comprising substantially coherent radiation at the at least one wavelength of fluorescence is produced that penetrates through the output coupler 20 substantially along the optical axis 10.

Due to the inefficiency of conversion of pump energy to laser radiation energy, some of the pump energy is converted into thermal energy that is distributed primarily within the gain region 26 of the lasant material 4. This thermal energy is at least partially dissipated through the side surface 8 of the lasing medium 4, preferably to a thermally coupled heat sink 30. Since the volume of the gain region 26 produced by the pump radiation 14 is typically much smaller that the volume of the lasing medium and the thermal conductivity of the lasing medium is typically poor, the thermal energy distribution in the lasing medium is necessarily non-uniform.

When the lasing medium 4 is generally cylindrical in shape, the non-uniform thermal energy distribution has a substantially radial temperature profile that can be represented by a polynominal with even powers of the radius s. The temperature rise in the lasing medium 4 is a linear function of the thermal power that it dissipates. The optical path length through the lasing medium 4 is also a linear function of the temperature rise of the lasing medium 4 and varies as a function of $\rho$. The optical path difference (OPD) between the side surface 8 and the axis of the lasing medium 4 along the optical path 10 can be represented by a polynomial such as described for z.

If the lasing medium 4 is uniformly heated, it will have a parabolic temperature profile that produces an optical aberration that comprises a spherical wavefront for the radiation transmitted through the lasing medium 4. Such a spherical wavefront can be corrected with a simple focus adjustment, such as by changing the length of the optical cavity 24, the curvature of the one of the end surfaces 6 with the dichroic coating 16 or the curvature of the surface of the output coupler 20 with the reflective coating 22.

In contrast, in the laser system 2 described above, the lasing medium 4 is non-uniformly heated, and thus has a much more complex thermal profile and an optical path difference that is the combination of optical aberration comprising the generation of a spherical wavefront for radiation passing through the lasing medium 4 in combination with optical aberration caused by higher-order functions of s. The optical aberrations of the transmitted radiation caused by the higher-order functions of s cannot be corrected with a simple focus adjustment.

The optical aberration due to the higher-order functions of $\rho$ can be corrected by interacting the transmitted radiation with an aspheric surface. This aspheric surface can be either of the end surfaces 6, for example, or any other surface within the optical cavity 24, such as the one of the surfaces of the output coupler 20 with the reflective coating 22.

Although either of the end surfaces 6 of the lasing medium 4 may be aspheric, the precise magnitude of the aspheric deformation surface will differ because the end surface 6 with the dichroic coating 16 is reflective for the lasing radiation and the end surface 6 with the optical coating 18 is transmissive for the lasing radiation. Likewise, if the surface for the reflective coating 22 on the output coupler 20 or the surface 32 on the optical element 34 is made aspheric, the precise shape of the scale of the asphere necessary for substantially complete correction of the optical aberrations due to the higher-order functions of $\rho$ will change. In any case, according to the invention, any intracavity surface can be formed into an aspheric surface that will substantially reduce this higher-order function optical aberration.

FIG. 2 is a schematic diagram of a second embodiment of the invention. A laser system 36, represented as a laser source, comprises the at least one source of pump radiation 12, the output coupler 20 the optical cavity 24, and optionally, the optical element 34 described for the laser system 2 in connection with FIG. 1, but it has a lasing medium 38 with two generally opposed end surfaces 40 and a generally circumferential side surface 42.

One of the end surfaces 40 has a means for cooling 44 thermally coupled to it. The means for cooling 44 has a central aperture 46 through which pumping and lasing radiation passes. The portion of the one of the end surfaces 40 that is exposed by the aperture 46 has a dichroic optical coating 48 that is substantially transmissive for the pumping radiation and substantially reflective for the lasing radiation. Likewise, the other one of the end surfaces 40 has an optical coating 50 that is substantially transmissive for the lasing radiation.

The cooling geometry provided by the means for cooling 44 generates a thermal profile that differs in detail from that of the edge-cooled geometry of the laser system 2 described in connection with FIG. 1. However, just as with the laser system 2, the thermal profile causes both focus and higher-order spherical aberration in the lasing radiation that passes through the lasing medium 38. In this embodiment, the aspheric correction surface can be either of the end surfaces 40, the surface of the output coupler 20 with the reflective coating 22, or the surface 32 of the optional optical element 34.

FIG. 3 is a schematic diagram of a third embodiment of the invention, wherein a laser system 52 comprises a lasing medium 54 that has two generally opposed end surfaces 56 and a generally circumferential side surface 58. The laser system 52 also comprises a plurality of the sources of pump radiation 12. At least a portion of each one of the sources of pump radiation 12 propagated toward one or another of two generally opposed end surfaces 56 of the lasing medium 54 along a corresponding one of a plurality of pump radiation propagation paths 60. Each of the end surfaces 56 have an optical coating 62 applied to them that is substantially transmissive for both the pumping and lasing radiation.

The laser system 52 also comprises a reflective element 64 placed along the optical path 10. The optical element 64 has a reflective optical coating 66 that is substantially reflective for the lasing radiation. The laser system further comprises the output coupler 20 that is placed along the optical path 10. Either of the two end surfaces 56, the surface of the optical element 64 that supports the reflective optical coating 66 or the surface of the output coupler 20 that supports its reflective optical coating may be aspheric to correct higher-order thermally-induced optical aberrations in the lasing medium 54. The optical element 34 may optionally be inserted in the optical path 10, wherein the aspheric surface 32 corrects the thermally-induced higher-order optical aberrations in the lasing medium 54.

Figure 4:
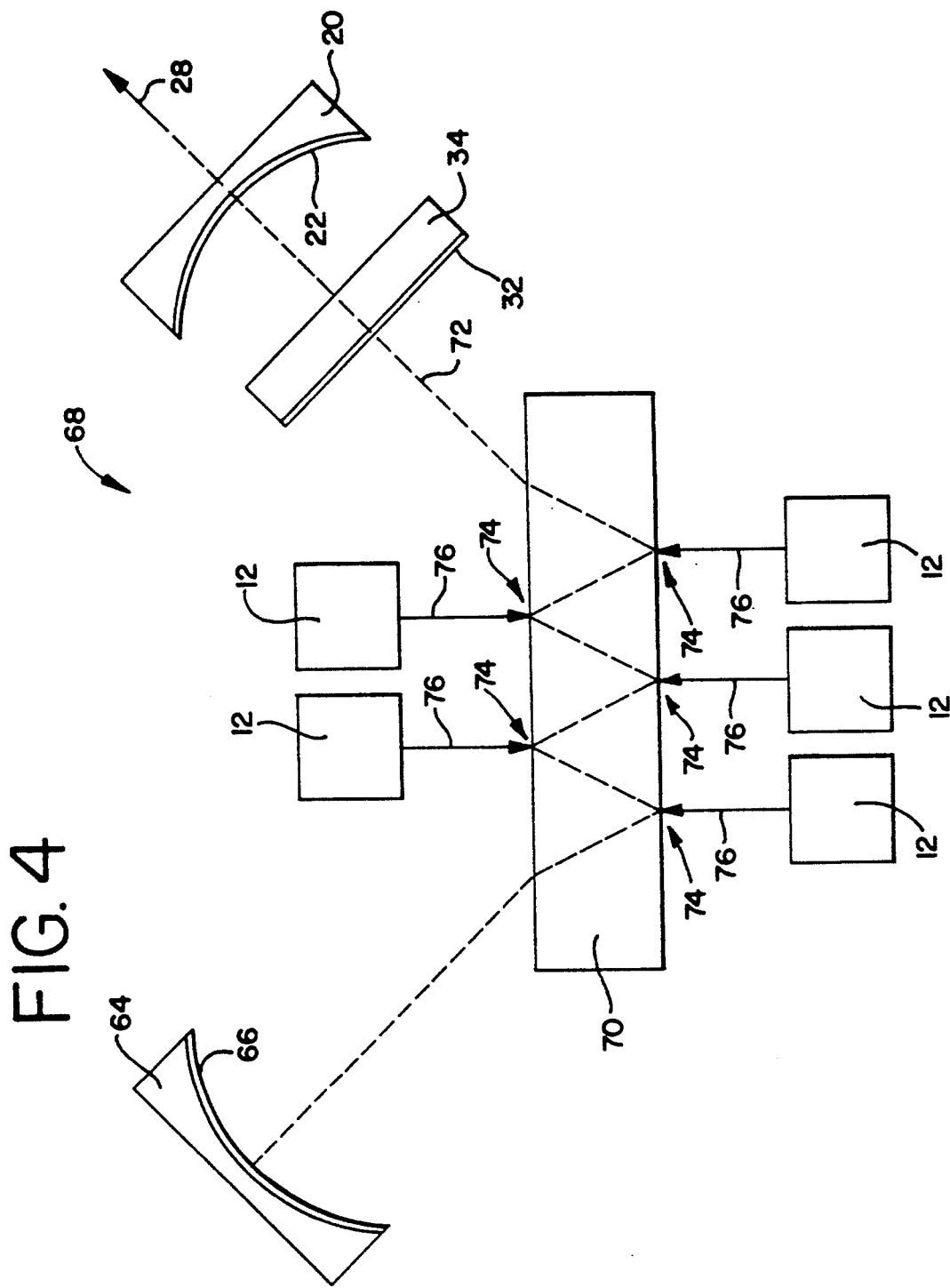
FIG. 4 is a schematic diagram of a fourth embodiment of the invention.

FIG. 4 is a schematic diagram of a fourth embodiment of the invention, wherein a laser system 68 comprises a lasing medium 70 that is pumped by a plurality of the sources of pump radiation 12. The lasing medium 70 comprises a multiple bounce slab, wherein an optical path 72 for the lasing radiation makes multiple reflections within the lasing medium due to substantially total internal reflection. At least a portion of the pump radiation from each one of the sources of pump radiation 12 propagates toward a respective one of a plurality of bounce areas 74 on the surface of the lasing medium along a corresponding one of a plurality of pump radiation paths 76. Each one of the bounce areas 74 is a region of the surface of the lasing medium wherein the lasing radiation is internally reflected.

In this embodiment, each one of the bounce areas 74 is the equivalent of an end surface of the lasing medium 70, making each one of the bounce areas 74 the equivalent of a lasing medium end surface in a multiple-end, end-pumped laser. Because the pump radiation is concentrated in the laser mode volume of the lasing medium 70, the optical aberration due to thermal effects from the pump radiation of each of the sources of pump radiation 12 near each of the bounce areas 74 will add coherently in a pass through the lasing medium 70 along the optical path 72.

Details of the cooling geometry will affect the nature of the optical aberration and the precise shape of the aspheric surface that is necessary to substantially correct the thermally-induced higher-order optical aberrations in the lasing medium 70. The geometry of the lasing system 68 can allow aberrations that are not radially symmetric, but have two planes of symmetry about the optical path 72.

In this case, either a single aspheric surface with the proper shape or a pair of aspheric surfaces can be used for correction of the higher-order aberrations. If two aspheric surfaces are used, each one is oriented along a corresponding one of the two lines of symmetry that together add to produce the proper correction. The aspheric surface or surfaces in the laser system 68 may be any of the bounce areas 74, the surface that supports the reflective coating 64 of the reflective element 66, the surface that supports the optical coating 22 of the output coupler 20 or the surface 32 of the optional element 34.

Figure 5:
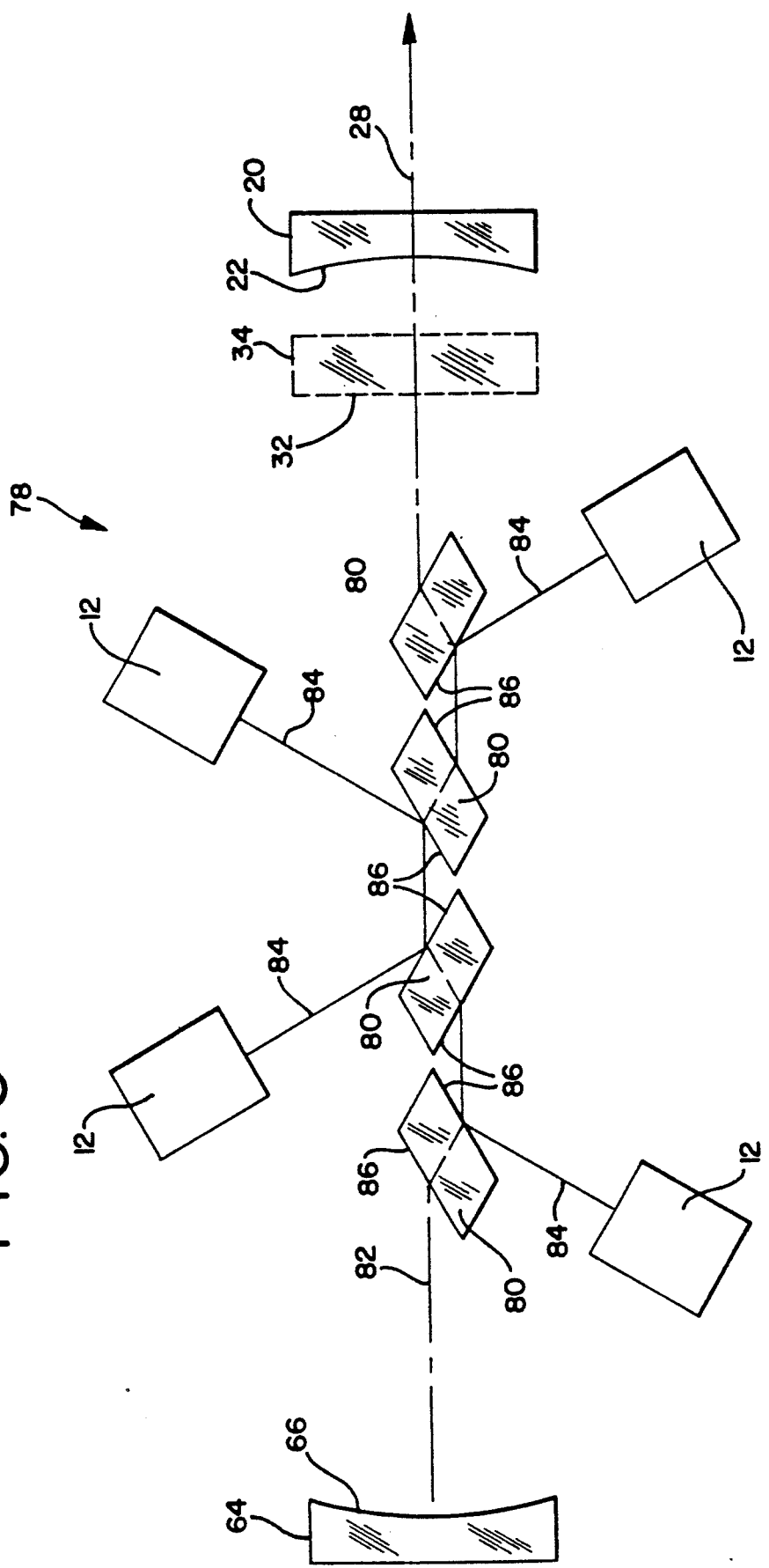
FIG. 5 is a schematic diagram of a fifth embodiment of the invention.

FIG. 5 is a schematic diagram of a fifth embodiment of the invention, wherein a laser system 78 comprises a plurality of lasing mediums 80. Each of the lasing mediums 80 comprises an brewster disc, and the lasing mediums 80 are oriented to provide a folded optical path 82 for the lasing radiation. At least a portion of the pump radiation from each of a plurality of the sources of pump radiation 12 is propagated along a respective one of a plurality of pump radiation paths 84 to effectively end-pump a respective one of the plurality of lasing mediums 80 through one of its two generally opposed end surfaces 86.

The thermally-induced optical aberration generated in each of the plurality of lasing mediums 80 adds coherently in a single pass of the lasing radiation along the optical path 82. A combination of aspheric surfaces that may comprise any of the surfaces 86, the surface that supports the reflective coating 66 of the reflective element 66, the surface that supports the optical coating 22 of the output coupler 20 or the surface 32 of the optional element 34.

Thus there has been described herein methods and apparatus for providing substantially complete correction of thermally-induced aberrations of the gain medium in an end-pumped laser system with at least one aspheric surface that is positioned within the optical cavity of the laser system. The at least one aspheric surface is shaped to substantially cancel all of the thermally-induced aberration of the gain medium at the normal power level of the laser system. It will be understood that various changes in the details, materials, steps and arrangements of parts that have been described and illustrated above in order to explain the nature of the invention may be made by those of ordinary skill in the art within the principle and scope of the present invention as expressed in the appended claims.

What is claimed is:

1. A method for reducing thermally-induced aberrations in the wavefront of substantially coherent radiation produced by a gain medium in an end-pumped laser system, comprising the steps of:
   interacting said wavefront with a substantially spherical surface by transmitting said wavefront through said spherical surface to reduce at least partially lower-order aberration of said wavefront along said optical path; and
   interacting said wavefront with a substantially aspheric surface placed along said optical path to reduce higher-order aberrations in said at least partially spherical propagation of said wavefront.

2. The method set forth in claim 1, wherein said step of interacting said wavefront with with said aspheric surface comprises the step of transmitting said wavefront through said aspheric surface to reduce said higher-order aberrations in said transmitted wavefront.

3. The method set forth in claim 1, wherein said step of interacting said wavefront with said aspheric surface comprises the step of reflecting said wavefront from said aspheric surface to reduce said higher-order aberrations in said reflected wavefront.

4. A method for reducing thermally-induced aberrations in the wavefront of substantially coherent radiation produced by a gain medium in an end-pumped laser system, comprising the steps of:
   interacting said wavefront with a substantially spherical surface by reflecting said wavefront with said spherical surface to at least partially reduce lower-order aberration of said wavefront along said optical path; and
   interacting said wavefront with a substantially aspheric surface placed along said optical path to reduce higher-order aberrations in said at least partially spherical propagation of said wavefront.

5. The method set forth in claim 4, wherein said step of interacting said wavefront with with said aspheric surface comprises the step of transmitting said wavefront through said aspheric surface to reduce said higher-order aberrations in said transmitted wavefront.

6. The method set forth in claim 4, wherein said step of interacting said wavefront with said aspheric surface comprises the step of reflecting said wavefront from said aspheric surface to reduce said higher-order aberrations in said reflected wavefront.

7. An apparatus for reducing thermally induced aberrations in the wavefront of substantially coherent radiation produced by a gain medium in an end-pumped laser system, comprising:
   means for interacting said wavefront with a substantially spherical surface placed along an optical path of said radiation by transmitting said wavefront through said spherical surface to reduce at least partially spherical propagation of said wavefront along said optical path; and
   means for interacting said wavefront with substantially aspheric surface placed along said optical path to reduce higher-order aberrations in said at least partially spherical propagation of said wavefront.

8. The apparatus set forth in claim 7, wherein said means for interacting said wavefront with with said aspheric surface transmits said wavefront through said aspheric surface to reduce said higher-order aberrations in said transmitted wavefront.

9. The apparatus set forth in claim 7, wherein said means for interacting said wavefront with said aspheric surface reflects said wavefront from said aspheric surface to reduce said higher-order aberrations in said reflected wavefront.

10. An apparatus for reducing thermally-induced aberrations in the wavefront of substantially coherent radiation produced by a gain medium in an end-pumped laser system, comprising:
    means for interacting said wavefront with a substantially spherical surface placed along an optical path of said radiation by reflecting said wavefront with said spherical surface to at least partially reduce lower-order aberration of said wavefront along said optical path; and
    means for interacting said wavefront with a substantially aspheric surface placed along said optical path to reduce higher-order aberrations in said at least partially spherical propagation of said wavefront.

11. The apparatus set forth in claim 10, wherein said means for interacting said wavefront with with said aspheric surface transmits said wavefront through said aspheric surface to reduce said higher-order aberrations in said transmitted wavefront.

12. The apparatus set forth in claim 10, wherein said means for interacting said wavefront with said aspheric surface reflects said wavefront from said aspheric surface to reduce said higher-order aberrations in said reflected wavefront.

* * * * *